(12) United States Patent
Park et al.

(10) Patent No.: US 8,171,841 B2
(45) Date of Patent: May 8, 2012

(54) DETACHABLE CONNECTING ROD AND COMPRESSOR HAVING THE SAME

(75) Inventors: Kyoung-Jun Park, Gyeongsangnam-Do (KR); Ji-Young Bae, Busan (KR); Jin-Kook Kim, Gyeongsangnam-Do (KR); Bum-Joon Kim, Gyeongsangnam-Do (KR); Hyuk Nam, Gyeongsangnam-Do (KR); Jong-Mok Lee, Gyeongsangnam-Do (KR); Jong-Hyuk Kim, Gyeongsangnam-Do (KR); Kyeong-Ho Kim, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 788 days.

(21) Appl. No.: 12/226,676

(22) PCT Filed: Dec. 29, 2006

(86) PCT No.: PCT/KR2006/005905
§ 371 (c)(1),
(2), (4) Date: Oct. 24, 2008

(87) PCT Pub. No.: WO2007/123301
PCT Pub. Date: Nov. 1, 2007

(65) Prior Publication Data
US 2009/0123305 A1    May 14, 2009

(30) Foreign Application Priority Data

Apr. 26, 2006  (KR) .................. 10-2006-0037852

(51) Int. Cl.
*F01B 29/00*    (2006.01)
*F01B 9/00*    (2006.01)

(52) U.S. Cl. ............... 92/128; 92/187; 92/254; 92/255; 74/579 R; 417/338

(58) Field of Classification Search .................. 417/338, 417/273, 571
See application file for complete search history.

(56) References Cited

U.S. PATENT DOCUMENTS

| 1,741,621 | A |  | 12/1929 | Godfrey |
| 4,770,058 | A | * | 9/1988 | Lilie et al. .................. 74/579 E |
| 5,881,631 | A | * | 3/1999 | Ryu et al. ........................ 92/187 |
| 6,382,081 | B2 | * | 5/2002 | Tanaka et al. ................... 92/128 |
| 2003/0108433 | A1 | * | 6/2003 | Ahn ............................ 417/222.2 |

FOREIGN PATENT DOCUMENTS

| DE | 3111947 A1 | 10/1982 |
| GB | 2 211 272 A | 6/1989 |
| WO | WO 99/57437 A | 11/1999 |

* cited by examiner

*Primary Examiner* — Sikha Roy
(74) *Attorney, Agent, or Firm* — McKenna Long & Aldridge LLP

(57) ABSTRACT

A detachable connecting rod includes a first member (410)a large end portion (411) having a trough hole (H1), and a first connection rod portion (412) extending from the large end portion (411), the first connection rod portion (412) having a pair of spaced apart arms defining a coupling groove (413) extending in the same direction as an axial direction of the through hole (H1); a second member (420) including a small end portion having a through hole (H2), and second connection rod portion (422) extending from the small end portion, the second connection rod (422) portion being inserted into the coupling groove (413) and a coupling unit for coupling the first connection rod portion (412) to the second connection rod portion inserted (412) into the coupling groove (413) of the first member (410). The detachable connecting rod is useable in a compressor.

7 Claims, 5 Drawing Sheets

[Fig. 1]
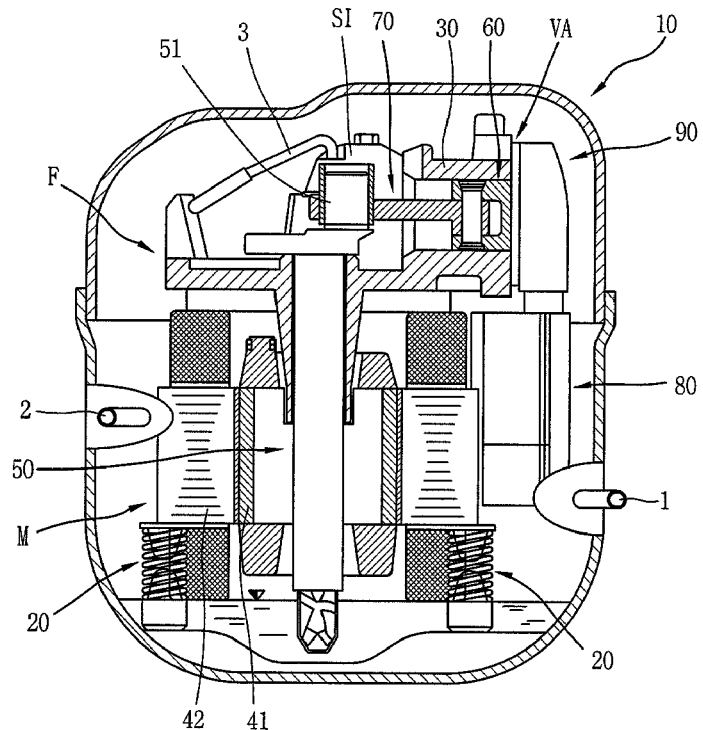
[Fig. 2]
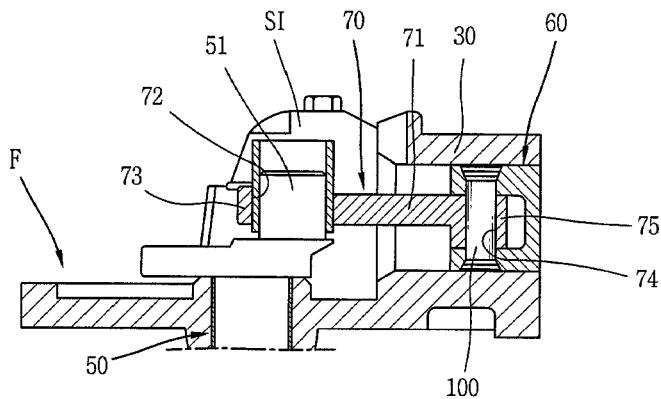
[Fig. 3]
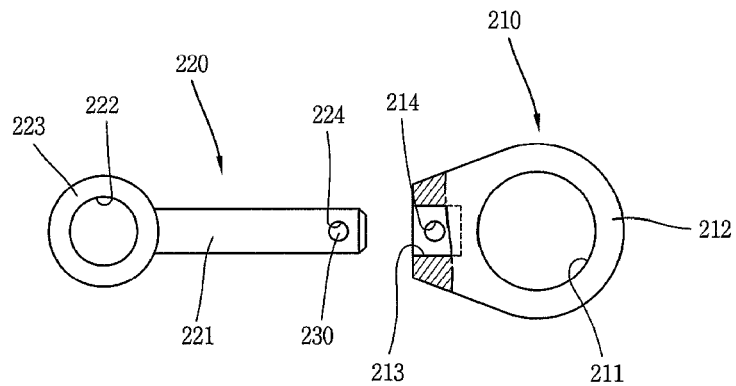

[Fig. 4]
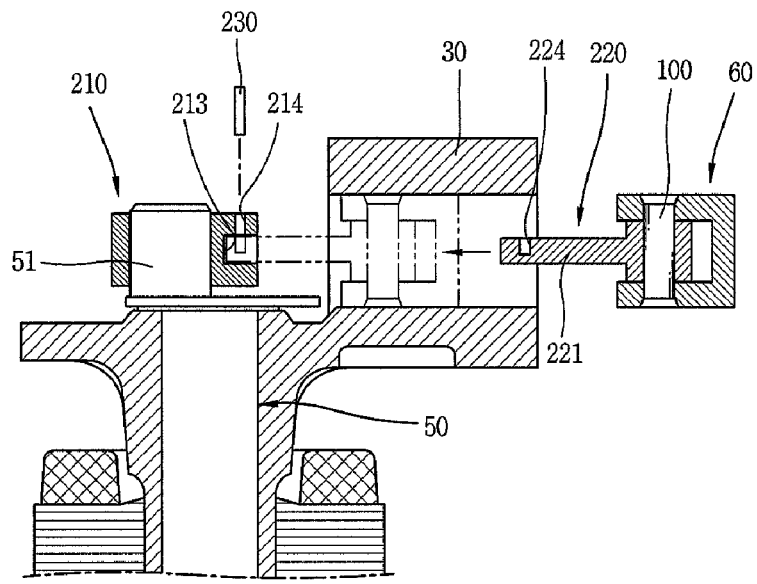
[Fig. 5]
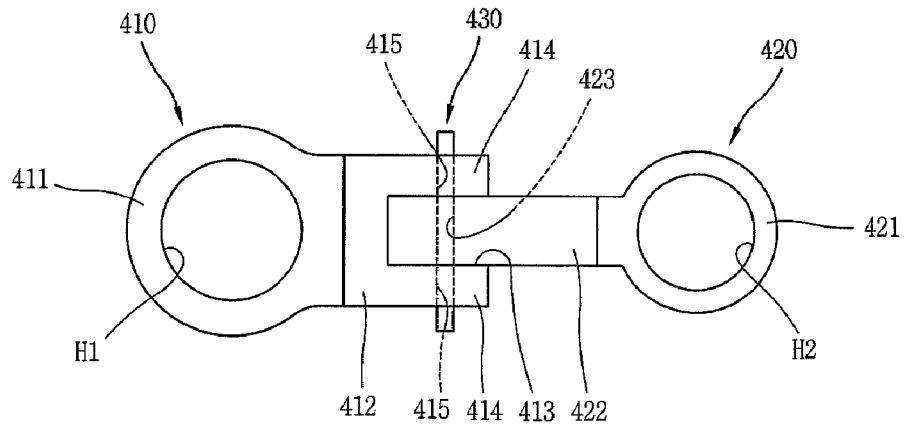
[Fig. 6]
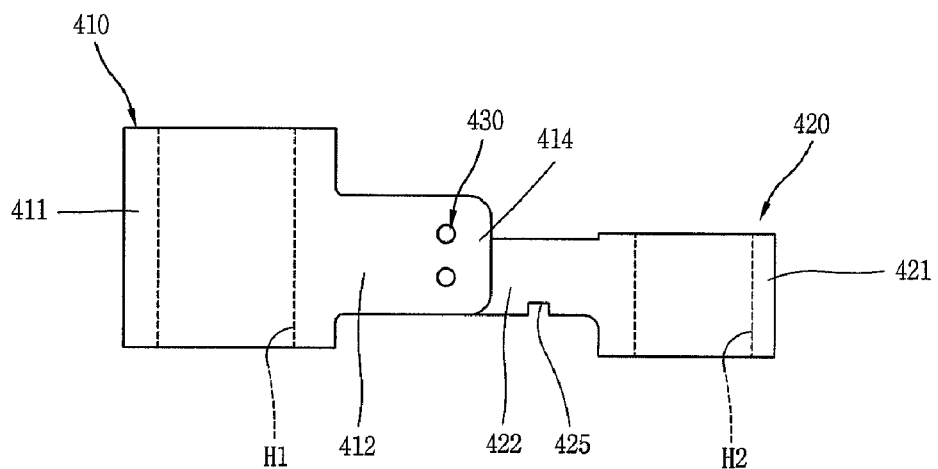

[Fig. 7]
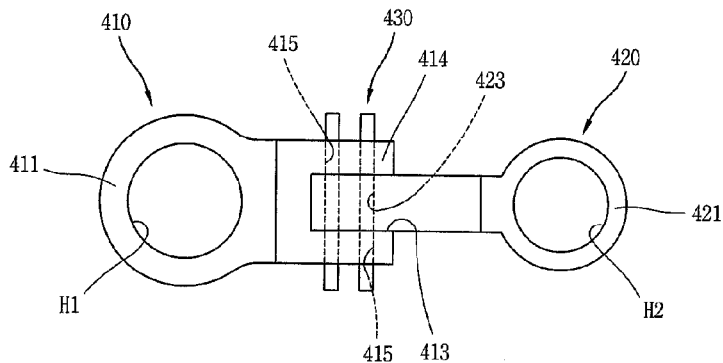
[Fig. 8]
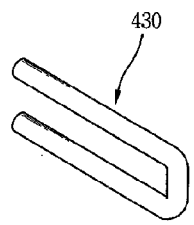
[Fig. 9]
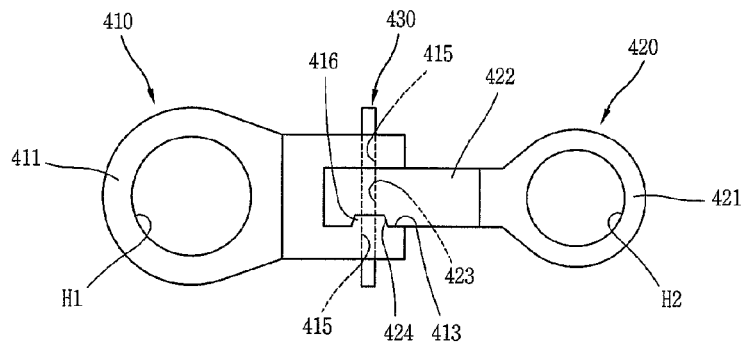
[Fig. 10]
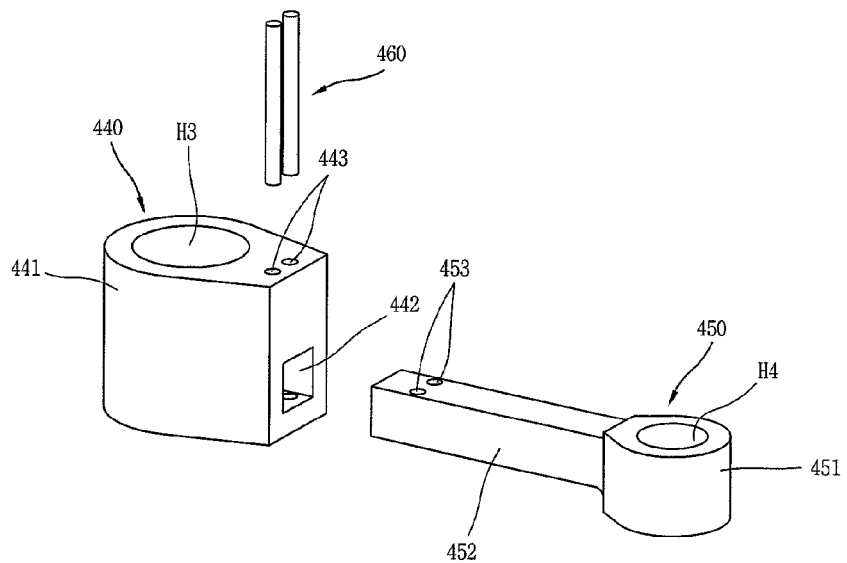

[Fig. 11]
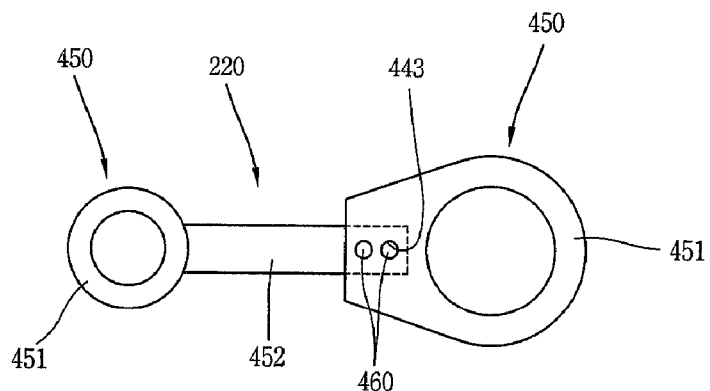
[Fig. 12]
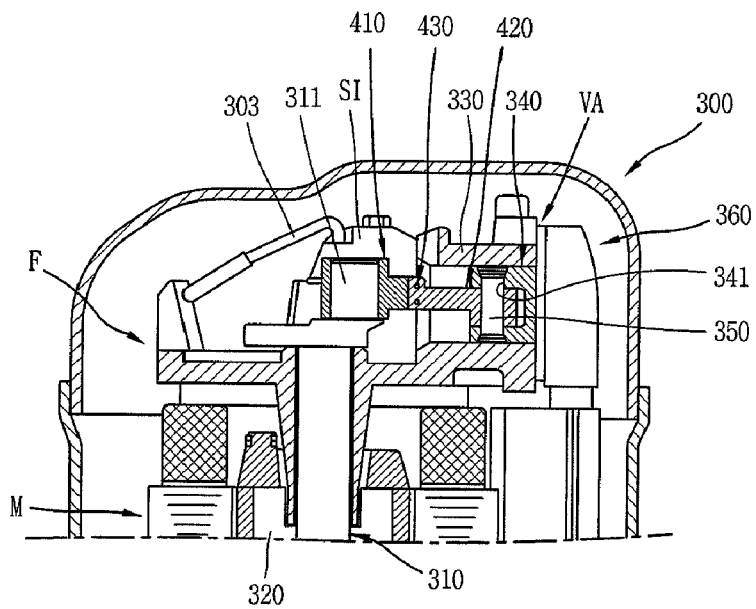
[Fig. 13]
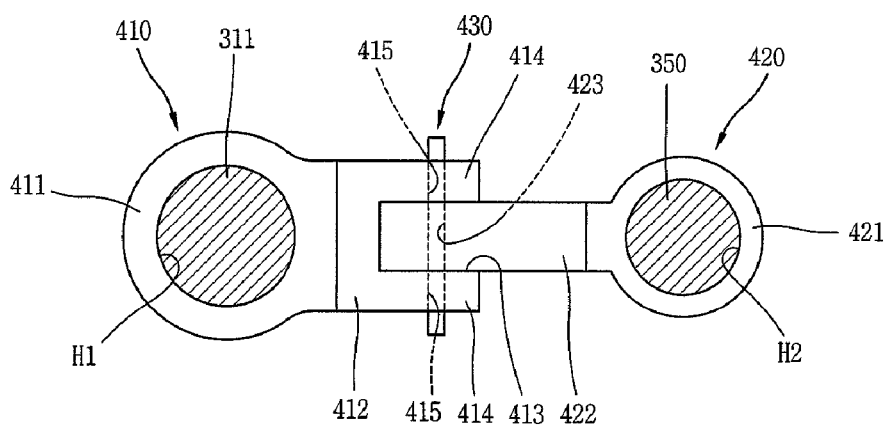

[Fig. 14]
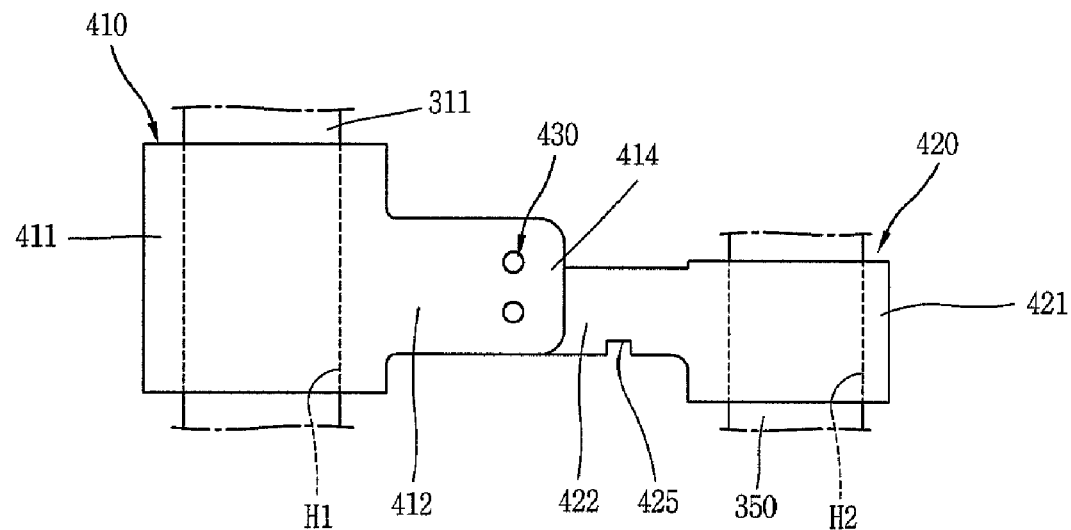
[Fig. 15]
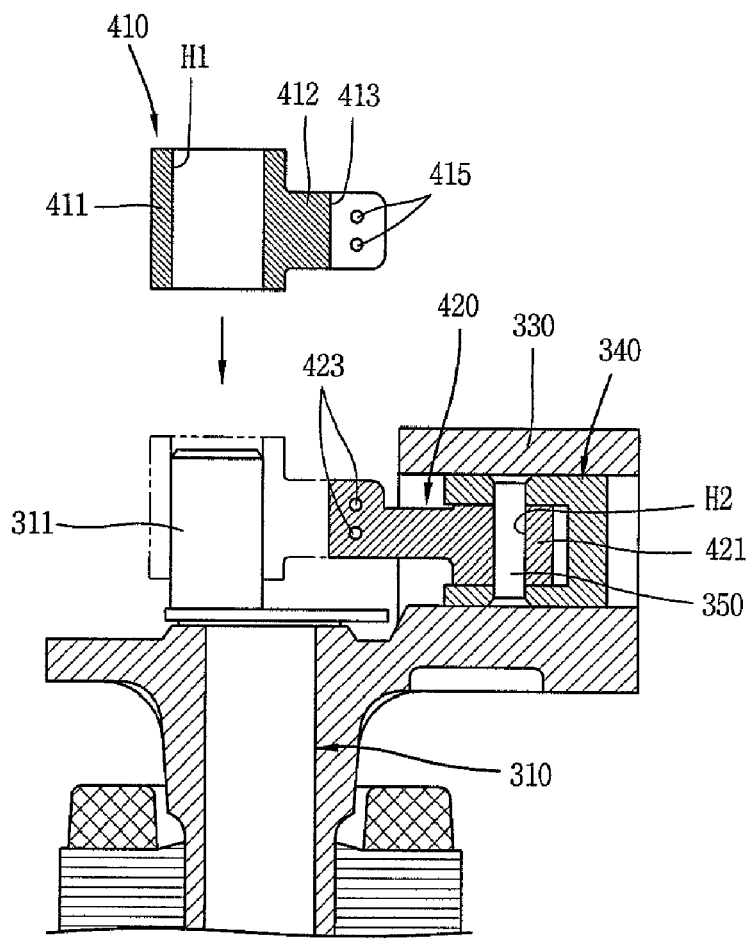

DETACHABLE CONNECTING ROD AND COMPRESSOR HAVING THE SAME

This application is an application based on International Patent Application No. PCT/KR2006/005905 filed Dec. 29, 2006, which claims the benefit of Korean Application No. 10-2006-0037852 filed Apr. 26, 2006, which are hereby incorporated by reference for all purposes as if fully set forth herein.

TECHNICAL FIELD

The present invention relates to a compressor, and particularly, to a detachable connecting rod that is capable of facilitating an assembling process as well as securely connecting a crankshaft to a piston, and a compressor having the same.

BACKGROUND ART

In general, compressors convert electrical energy into kinetic energy and compress gas by the kinetic energy. The compressors include a rotary compressor, a scroll compressor, a reciprocal compressor and the like according to a compression mechanism.

FIG. 1 is a sectional view showing an exemplary reciprocal compressor. As shown in FIG. 1, a reciprocal compressor includes a casing 10, a driving motor M positioned within the casing 10 to generate a rotation force, an elastic supporting unit 20 to elastically support the driving motor M to the casing 10, a frame F having a cylinder 30 and positioned at an upper portion of the driving motor M, a crankshaft 50 penetratingly inserted in the center of the frame F and fixedly coupled to a rotor 41 of the driving motor M, a piston 60 movably inserted in the cylinder 30, a connecting rod 70 used to connect the crankshaft 50 to the cylinder 30 to thus convert the rotational motion into a linear reciprocating motion, thereby transferring the linear reciprocating motion to the cylinder 30, a valve assembly VA mounted at one side of the cylinder 30, and a suction muffler 80 and a discharge muffler 90 connected to the valve assembly VA.

The casing 10 is connected to a gas suction pipe 1 into which gas is introduced and a gas discharge pipe 2 through which a compressed gas is discharged.

Reference numeral 3 denotes a loop pipe, 42 denotes a stator, and SI denotes a silencer.

An operation of the reciprocal compressor will now be explained.

First, upon applying power to the compressor, the driving motor M is driven to generate a rotation force. The rotation force of the driving motor M is then delivered to the crankshaft 50 to rotate it. The rotational motion of the crankshaft 50 is converted into the linear reciprocating motion by the connecting rod 70 coupled to an eccentric portion 51 of the crankshaft 50. The linear reciprocating motion is transferred to the piston 60 to linearly reciprocate the piston 60 within the cylinder 30. The linear reciprocating motion of the piston within the cylinder 30 and an operation of the valve assembly VA suck gas into the cylinder 30 via the gas suction pipe 1 and a suction muffler 80, and then the sucked gas is compressed therein to thus be discharged. The discharged compressed gas is discharged outside the casing 10 through the gas discharge pipe 2.

In the compressor, on the other side, the connecting rod 70 which converts the rotational motion of the crankshaft 50 into a linear motion to transfer it to the piston 60, as shown in FIG. 2, includes a rod portion 71 having a certain length, an annular large end portion 73 extending from one side of the rod portion 71 and having a through hole 72 therein, and an annular small end portion 75 extending from the other side of the rod portion 71 and having a through hole 74 therein.

Regarding the connecting rod 70, the eccentric portion 51 of the crankshaft 50 is inserted into the through hole 72 of the large end portion 73, and a piston pin 100 which connects the piston 60 to the connecting rod 70 is inserted into the through hole 74. of the small end portion 75.

In the arrangement shown in FIGS. 1 and 2, the connecting rod 70 is integrally formed and as a result it is very complicated to perform an assembly operation for respectively coupling the connecting rod 70 to the eccentric portion 51 of the crankshaft 50 and to the piston 60. Particularly, in the case that the cylinder 50 is integrally formed with the frame F, the assembling operation for respectively coupling the integral connecting rod 70 to the eccentric portion 51 of the crankshaft 50 and to the piston 60 can hardly be performed.

In order to solve such problem, one approach has been developed such that the connecting rod 70 is divided into two separate components, and each divided component is coupled to the eccentric portion 51 of the crankshaft 50 and to the piston 60, to thereby connect the component coupled to the crankshaft 50 and the component coupled to the piston 60 to each other.

The technology disclosed in JP10196537 describes such an approach with an exemplary detachable connecting rod, as shown in FIG. 3. The detachable exemplary detachable connecting rod includes a large end portion block 210, a rod integral-type small end portion member 220 coupled to the large end portion block 210, and a coupling pin 230 to connect the large end portion block 210 and the rod integral-type small end portion member 220 to each other.

The large end portion block 210 is composed of a body 212 having a particular shape and a certain thickness and also having a through hole 211 therein. An insertion groove 213 formed in a side portion of the body 212 to have a certain inside diameter and depth, and a pin hole 214 longitudinally penetrates the insertion groove 213.

The rod integral-type small end portion member 220 is composed of a filled cylindrical rod portion 221 having a certain length, and an annular small end portion 223 extending from one side of the rod portion 221 and also having a through hole 222 therein. A pin hole 224 is penetratingly formed at an end part of the other side of the rod portion 221.

Regarding the detachable connecting rod, as shown in FIG. 4, the large end portion block 210 is inserted onto the eccentric portion 51 of the crankshaft 50. The rod integral-type small end portion member 220 is coupled to the piston 60. The rod integral-type small end portion member 220 is then inserted through the cylinder 30 to allow the rod portion 221 of the rod integral-type small end portion member 220 to be inserted into the insertion groove 213 of the large end portion block 210. Thereafter, the pin hole 214 of the large end portion block 210 is aligned to the pin hole 224 of the rod portion 221 of the rod integral-type small end portion member 220, and then the coupling pin 230 is inserted into the pin holes 214 and 224.

DISCLOSURE OF INVENTION

Technical Problem

However, in this structure, because the rod portion 221 of the rod integral-type small end portion member 220 coupled to the piston 60 is inserted into the insertion groove 213 formed at the side surface of the large portion block 210 coupled to the eccentric portion 51 of the crankshaft 50, and also the pin hole 224 of the rod portion 221 and the pin hole 214 of the large end portion block 210 are aligned to each other by rotating the rod integral-type small end portion member 220 to thereby insert the coupling pin 230 into the pin holes 214 and 224, it may make it difficult and complicated to perform the assembling process and may decrease the productivity of, for example, an assembly line.

Technical Solution

Therefore, an object of the present invention is to provide a detachable connecting rod that is capable of facilitating an assembling process as well as securely connecting a crankshaft to a piston, and a compressor having the same.

To achieve these and other advantages and in accordance with the purpose of the present invention, as embodied and broadly described herein, there is provided a detachable connecting rod comprising a first member including a large end portion having a through hole, and a first connection rod portion extending from the large end portion, the first connection rod portion having a pair of spaced apart arms defining a coupling groove extending in the same direction as an axial direction of the through hole; a second member including a small end portion having a through hole, and a second connection rod portion extending from the small end portion, the second connection rod portion is inserted into the coupling groove; and a coupling unit to couple the first connection rod portion to the second connection rod portion inserted into the coupling groove of the first member.

According to another aspect of the present invention, there is provided a detachable connecting rod comprising a first member including a body portion having a through hole, the body portion having an insertion groove formed at a side surface of the body portion and having a polygonal shaped cross-section, and a plurality of pin holes formed at the body portion and penetrating the insertion groove; a second member including a small end portion having a through hole, a rod portion extending from the small end portion, the rod portion having a polygonal shaped end portion, and a plurality of pin holes formed in the rectangular shaped end portion corresponding to the pin holes of the first member; and a plurality of coupling pins respectively inserted into the pin holes of the first member and the second member after the polygonal shaped end portion is inserted into the insertion groove of the first member.

According to yet another aspect, there is provided a compressor comprising a driving motor to generate a rotation force; a crankshaft having an eccentric portion and being rotated by the rotation force applied from the driving motor; a piston inserted into a cylinder; a first member including a large end portion having a through hole in which the crankshaft is inserted, and a first connection rod portion extending from the large end portion, the first connection rod portion having a pair of spaced apart arms defining a coupling groove extending in the same direction as an axial direction of the through hole; a second member including a small end portion having a through hole in which a piston pin connected to the piston is inserted, and a second connection rod portion extending from the small end portion, the second connection rod portion being inserted into the coupling groove; and a coupling unit to couple the first connection rod portion to the second connection rod portion of the second member inserted into the coupling groove of the first member.

In still another aspect, there is provided a detachable connecting rod comprising a first member including a large end portion having a through hole, and a first connection rod portion extending from the large end portion, the first connection rod portion having a coupling groove extending in the same direction as an axial direction of the through hole; a second member including a small end portion having a through hole, and a second connection rod portion extending from the small end portion, the second connection rod portion being inserted into the coupling groove; and a coupling unit for coupling the first connection rod portion to the second connection rod, the coupling unit including a pin penetrating both the first and second connection rod portions through the coupling groove and a rotation preventing member that prevents the second member from rotating substantially with respect to the first member.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

ADVANTAGEOUS EFFECTS

In the detachable connecting rod and the compressor having the detachable connecting rod according to the present invention, the crankshaft and the piston can be firmly connected to each other, and the assembling process of the detachable connecting rod and the component assembling process of the crankshaft, the piston and the detachable connecting rod can simply easily be performed, whereby it is possible to prevent the change in the distance between the crankshaft and the piston to thus constantly maintain a compression efficiency of the gas compressed in the compressor, resulting in improving reliability of the compressor and increasing the productivity of the assembly line.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a sectional view showing an example of a typical reciprocal compressor;

FIG. 2 is a sectional view showing a compression part of the reciprocal compressor;

FIG. 3 is a plane view showing an exploded detachable connecting rod of the related art compressor;

FIG. 4 is a sectional view showing an assembling process of the detachable connecting rod of the compressor;

FIGS. 5 and 6 are plane view and front view showing a first embodiment of a detachable connecting rod according to the present invention;

FIG. 7 is a plane view showing positions of coupling pins constituting the first embodiment of the detachable connecting rod according to the present invention;

FIG. 8 is a perspective view showing another modification of the coupling pin constituting the first embodiment of the detachable connecting rod according to the present invention;

FIG. 9 is a plane view showing modifications of first member and second member constituting the first embodiment of the detachable connecting rod according to the present invention;

FIGS. 10 and 11 are exploded perspective view and plane view respectively showing a second embodiment of a detachable connecting rod according to the present invention;

FIG. 12 is a sectional view showing a compressor having a detachable connecting rod according to the present invention;

FIGS. 13 and 14 are plane view and front view showing a connecting rod constituting the compressor having the detachable connecting rod according to the present invention; and FIG. 15 is a sectional view showing an assembled state of the compressor having the detachable connecting rod according to the present invention.

MODE FOR THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

A detachable connecting rod and a compressor having the same will now be explained in detail in accordance with embodiments of the present invention with reference to the attached drawings hereafter.

FIGS. 5 and 6 are plane and front views showing a first embodiment of a detachable connecting rod according to the present invention.

As shown in FIGS. 5 and 6, a detachable connecting rod 400 according to the present invention is composed of a first member 410, a second member 420, and a coupling unit to couple the first and second members 410 and 420 to each other. The first member 410 includes a large end portion 411 having a through hole H1, a first connection rod portion 412 extending from the large end portion by a certain length, and a coupling groove 413 penetratingly formed at an end part of the connection rod portion 412 in the same direction as an axial direction of the through hole H1. The connection rod portion 412 of the first member 410 extends from a side portion of the large end portion 411 and is substantially perpendicular to an axial direction of the through hole H1 of the large end portion 411.

The coupling groove 413 of the first member 410 has a certain width and a certain depth so that one side thereof can be opened in a length direction of the first member 410. The formation of the coupling groove 413 is formed and defined by supporting portions 414 or spaced apart arms at both sides of the coupling groove 413. Then, pin holes 415 are respectively formed through the supporting portions 414 formed at both sides of the coupling groove 413. Preferably, two pin holes are formed at each of the supporting portions 414. As shown in FIG. 6, the pin holes 415 are positioned with a certain interval therebetween in the same direction as an axial direction of the through hole H1 of the large end portion 411.

The second member 420 is composed of a small end portion having a through hole H2, and a second connection rod portion 422 extending from the small end portion 421 by a certain length, wherein one side of the second connection rod portion 422 is inserted into the coupling groove 413.

The second connection rod portion 422 of the second member 420 is formed at a side part of the small end portion 421 and extends by a certain length substantially perpendicular to the center of the through hole H2 of the small end portion 421. An end part of the second connection rod portion 422 of the second member 420 has a certain width to correspond to the shape of the coupling groove 413 of the first member 410.

Its sectional shape is preferably rectangular. The pin holes 423 are formed at the end part of the second connection rod portion 422 of the second member 420 inserted into the coupling groove 413 of the first member 410 and the number of pin holes 423 corresponds to the number of the pin holes 415 of the first member 410. The pin holes 423 formed at the second connection rod portion 422 of the second member 420 are positioned with a certain interval therebetween in the same direction as an axial direction of the through hole H2 of the small end portion 421. A distance between an end surface of the connection rod portion 422 of the second member 420 and the center of the pin hole 423 is preferably the same as a distance between an inner wall surface of the coupling groove 413 of the first member 410 and the center of the pin hole 415.

The coupling unit is composed of two coupling pins 430. By providing two coupling pins, pivoting/rotation of the second member 420 with respect to the first member 410 can be limited. As shown in the figures, the coupling pins 430 are circular in cross-section. However, they are not limited to being circular as other suitable cross-sections could be used, such as, for example, square, rectangular, triangular, or other non-circular cross-sections. Selection of appropriate pin cross-sections can also assist in limiting rotation of the second member 420 with respect to the first member 410.

The end part of the connection rod portion 422 of the second member 420 is inserted into the coupling groove 413 of the first member 410. Then, in the state that the pin holes 415 of the first member 410 and the pin holes 423 of the second member 420 are aligned to each other, the two coupling pins 430 are respectively press-fitted in the pin holes 415 and 423.

A position-fixing groove 425 is preferably disposed at one side of the second connection rod portion 422 of the second member 420. The position-fixing groove 425 is used to fix the positions of the first member 410 and the second member 420 by a separate member (not shown) when coupling the first member 410 to the second member 420. In the exemplary embodiment shown in FIGS. 5 and 6, the second connection rod portion 422 has a varying profile such that the height between the positioning fixing groove 425 and an upper surface of the second connection rod portion 422 is different than the height of the second connection rod portion 422 at the location of the pin holes 423.

Regarding another exemplary modification of the pin holes 415 of the first member 410 and the pin holes 423 of the second member 420, as shown in FIG. 7, the pin holes 415 of the first member 410 are positioned with a certain interval therebetween in a direction perpendicular to the axial direction of the through hole H1 of the large end portion 411, whereas the pin holes 423 of the second member 420 are positioned with a certain interval therebetween in correspondence to the pin holes 415 of the first member 410 in a direction perpendicular to the axial direction of the through hole H2 of the small end portion 421. In the state that the pin holes 415 of the first member 410 and the pin holes 423 of the second member 420 are aligned to each other, the coupling pins 430 are press-fitted in the pin holes 415 and 423, respectively.

In the case that the pin holes 415 of the first member 410 are positioned in the same direction as the axial direction of the through hole H1 of the large end portion 411 and the pin holes 423 of the second member 420 are positioned in the same direction as the axial direction of the through hole H2 of the small end portion 420, it is possible to decrease an interval between the through hole H1 of the first member 410 and the through hole H2 of the second member 420.

In addition, the two coupling pins 430 inserted into both the pin holes 415 of the first member 410 and the pin holes 423 of the second member 420, as shown in FIG. 8, may be connected to each other to thus be integrated with each other.

In order to couple the first member 410 to the second member 420 at an accurate position, as shown in FIG. 9, a guide protrusion 416 having certain width and length extends from an inner wall of the coupling groove 413 of the first member 410 (e.g. from an inner wall of one of the spaced apart arms 414) in the same direction as the axial direction of the through hole H1. A guide groove 424 in which the guide protrusion 416 is inserted is formed at the second connection rod portion 422 of the second member 420, which is inserted into the coupling groove 413. Alternatively, the guide protrusion 416 may be formed at the second member 420 and the guide groove 424 be formed at the first member 410. The guide protrusion 416 and guide groove 424 also assist in limiting displacement of the second member 420 with respect to the first member 420 in a length direction of the second connection member 422.

The pin holes 415 are formed at an inner region of the guide protrusion 416 of the first member 410 and the pin holes 423 are formed at an inner region of the guide groove 424 of the second member 420. Here, upon inserting the guide protrusion 416 into the guide groove 424, the positions of the pin holes 415 and 423 correspond to each other. Accordingly, it can be easy to align the positions of the pin holes 415 of the first member 410 to the positions of the pin holes 423 of the second member 420. Furthermore, one of each of the pin holes 415, 423 can be eliminated if the guide protrusion 416 and guide groove 424 is configured to assist in preventing rotation of the second member 420 with respect to the first member 410.

An assembling process of the detachable connecting rod having such construction will now be explained.

In the state of positioning the second member 420 in a perpendicular direction of the through hole Hi of the first member 410, the end part of the connection rod portion 422 of the second member 420 is inserted into the coupling groove 413 of the first member 410. Here, the second member 420 is inserted into the first member 410 in the perpendicular direction. An end surface of the connection rod portion 422 of the second member 420 is in contact with an inner wall of the coupling groove 413 of the first member 410, and accordingly the pin holes 415 of the first member 410 are aligned to the pin holes 423 of the second member 420. The coupling pins 430 are then inserted into the aligned pin holes 415 and 423, respectively. Since the one side of the coupling groove 413 of the first member 410 is opened, the second member 420 is inserted into the first member 410 in the perpendicular direction and the coupling pins 430 are respectively inserted into the aligned pin holes 415 and 423. Accordingly, it is easy to couple the first member 410 and the second member 420, and it is also simple to correspond the pin holes 415 and 423 to each other.

FIG. 10 is an exploded perspective view showing a second exemplary embodiment of a detachable connecting rod according to the present invention.

As shown in FIG. 10, the detachable connecting rod is composed of a first member 440, a second member 450, and a plurality of coupling pins 460 to connect the first member 440 to the second member 450.

The first member 440 includes an insertion groove 442 formed in a rectangular shape with a certain length and formed at a side surface of a body portion 441 having a through hole H3, and a plurality of pin holes 443 formed at the body portion 441 to penetrate the insertion groove 442. Preferably, the number of pin holes 443 of the first member 440 is two. As shown in FIG. 10, the insertion groove 442 is rectangular, but need not be limited to this shape. For example, the insertion groove 442 may have any polygonal shape, such as square, hexagonal, triangular, or any other arrangement having a plurality of straight edges, or, for example, a semicircular shape.

The second member 450 preferably includes a small end portion 451 having a through hole H4 in which a piston pin (not shown) is inserted, a rod portion 452 extending from the small end portion 451 by a certain length and having a section of a rectangular shape, and a plurality of pin holes 453 formed at the rod portion 452 to be correspondent with the pin holes 443 of the first member 440. The number of the pin holes 453 of the second member 450 is preferably two. Similar to the insertion groove 442, the rod portion 452 may have a corresponding polygonal shaped end portion, such that the cooperation of the insertion groove 442 and the rod portion 452 may limit pivotinglrotation about an axis in the length direction of the rod portion 452.

Coupling pins 460 are respectively inserted into the pin holes 443 of the first member 440 and the pin holes 453 of the second member 450 which are inserted into the insertion groove 442 of the first member 440.

The pin holes 443 and 453 of the first and second members 440 and 450 are arranged by a certain interval therebetween in a direction perpendicular to a length direction of the rod portion 452 of the second member 450.

The pin holes 443 and 453 of the first and second members 440 and 450, as shown in FIG. 11, may also be arranged by a certain interval therebetween in a length direction of the rod portion 452 of the second member 450.

The assembling process of the first member 440, the second member 450 and the coupling pin 460 will now be explained hereafter.

After positioning the second member 450 so that the through hole H4 of the second member 450 can be placed in a perpendicular direction, the rod portion 452 of the second member 450 is inserted into the insertion groove 442 of the first member 440. In the state of aligning the pin holes 443 of the first member 440 to the pin holes 453 of the second member 450, the coupling pins 460 are inserted into the pin holes 443 of the first member 440 and the pin holes 453 of the second member 450, respectively. Here, the insertion groove 442 of the first member 440 is formed in a rectangular shape and the rod portion 452 of the second member 450 is also formed in the rectangular shape. Accordingly, when the rod portion 452 of the second member 450 is inserted into the insertion groove 442 of the first member 440, the pin holes 443 of the first member 440 are aligned to the pin holes 453 of the second member 450, whereby it is simple and convenient to align the positions of the pin holes 443 of the first member 440 to the positions of the pin holes 453 of the second member 450.

FIG. 12 is a sectional view showing a compressor 300 having a detachable connecting rod according to the present invention.

As shown in FIG. 12, a driving motor M to generate a rotation force by a power supply is provided within a casing, a frame F is positioned at an upper side of the driving motor M, and a crankshaft 310 is penetratingly formed at the frame F to thus be fixedly coupled to a rotor 320 of the driving motor M.

A cylinder 330 is provided at the frame F and a piston 340 is movably inserted into the cylinder 330. The cylinder 330 is integrally formed with the frame F. Alternatively, the cylinder 330 may be disposed at the frame F as a separate component.

The crankshaft 310 is provided with an eccentric portion 311 formed at one side of the crankshaft 310 and having certain outer diameter and length, the center of the eccentric portion 311 being eccentric from the crankshaft 310.

The crankshaft and the piston are connected to each other via a detachable connecting rod.

Regarding the detachable connecting rod, as shown in FIGS. 13 and 14, the first member 410 is inserted into the eccentric portion 311 of the crankshaft 310. The first member 410 is composed of the large end portion 411 having the through hole H1 in which the eccentric portion 311 of the crankshaft 310 is inserted, the first connection rod portion 412 extending from the large end portion 411 by a certain length, and the coupling groove 413 penetratingly formed at the end part of the first connection rod portion 412 in the same direction as the axial direction of the through hole H1. The first connection rod portion 412 of the first member extends from the side part of the large end portion 412 to thus be perpendicular to the axial direction of the through hole H1 of the large end portion 411.

The coupling groove 413 of the first member 410 has a certain width and a certain depth so that one side thereof can be opened in a length direction of the first member 410. The formation of the coupling groove 413 forms the supporting portions 414 or spaced apart arms at both sides of the coupling groove 413. The pin holes 415 are formed through the supporting portions 414 positioned at both sides of the coupling groove 413. Two pin holes 415 may preferably be formed at each of the supporting portions 414. The pin holes 415 are positioned with a certain interval therebetween in the same direction as the axial direction of the through hole H1 of the large end portion 411.

The first member 410 is coupled to the crankshaft 310 by inserting the eccentric portion 311 into the through hole H1 of its large end portion 411.

The second member 420 is coupled to the piston 340 by use of a piston pin 350. The second member 420 is composed of the small end portion 421 having the through hole H2 in which the piston pin 350 is inserted, and the second connection rod portion 422 extending from the small end portion 421 by a certain length and of which one end is inserted into the coupling groove 413.

The second connection rod portion 422 of the second member 420 is formed at the side part of the small end portion 421 with a certain length to be perpendicular to the center of the through hole H2 of the small end portion 421. Preferably, the end part of the second connection rod portion 422 of the second member 420 has a certain width to have a corresponding shape with that of the coupling groove 413 of the first member 410, and has a section of a rectangular shape. The pin holes 423 are formed at the end part of the second connection rod portion 422 of the second member 420 which is inserted into the coupling groove 413 of the first member 410, the number of pin holes 423 of the second member 420 being the same as that of the pin holes 415 of the first member 410. The pin holes 423 formed at the second connection rod portion 422 of the second member 420 are positioned with a certain interval therebetween in the same direction as the axial direction of the through hole H2 of the small end portion 421. A distance between the end surface of the second connection rod portion 422 of the second member 420 and the center of the pin hole 423 may preferably be the same as a distance between the inner wall surface of the coupling groove 413 of the first member 410 and the center of the pin hole 415.

The small end portion 421 of the second member 420 is inserted into the piston 340. In the state that the through hole H2 of the small end portion 421 is aligned to a pin hole 341 formed at the piston 340, the piston pin 350 is inserted into both the pin hole 341 of the piston 340 and the through hole H2 of the small end portion 421.

The first member 410 and the second member 420 are connected to each other via a coupling unit. The coupling unit is composed of two coupling pins 430.

In the state that the end part of the second connection rod portion 422 of the second member 420 is inserted into the coupling groove 413 of the first member 410 and thus the pin holes 415 of the first member 410 are aligned to the pin holes of the second member 420, the two coupling pins 430 are press-fitted in the pin holes 415 and 423, respectively.

As explained above, the detachable connecting rod has the same construction as that shown in the first embodiment of the detachable connecting rod of the present invention, and thus the detailed explanation of the position and shape of the coupling pin 430, the guide protrusion 416 and the guide groove 424 will be omitted.

An assembling process of the compressor having the detachable connecting rod according to the present invention will now be explained.

As shown in FIG. 15, first, an assembly body where the piston 340 has been coupled to the second member 420 is penetratingly inserted into the cylinder 330. The first member 410 is coupled to the crankshaft 310 in the perpendicular direction in order to allow the eccentric portion 311 of the crankshaft 310 to be inserted into the through hole H1 of the first member 410, and the end part of the second connection rod portion 422 of the second member 420 is inserted into the coupling groove 413 of the first member 410. In the state that the pin holes 415 of the first member 410 and the pin holes 423 of the second member 420 are aligned to each other, the coupling pins 430 are inserted into the first holes 415 of the first member 410 and the pin holes 423 of the second member 420, respectively. Here, the second connection rod portion 422 of the second member 420 is inserted into the coupling groove 413 of the first member 410 while inserting the first member 410 into the eccentric portion 311 of the crankshaft 310 in the perpendicular direction, which makes it easy and simple to couple the first member 410 to the second member 420. The second member 420 is then pushed to align the positions of the pin holes 423 of the second member 420 to the positions of the pin holes 415 of the first member 410, which makes it easy to correspond the positions of the pin holes 415 and 423 with each other.

Hereinafter, an operation effect of the compressor having the detachable connecting rod according to the present invention will now be explained.

First, upon operating the driving motor M, a rotation force of the driving motor M is delivered to the crankshaft 310 to rotate the crankshaft 310. According to the rotation of the crankshaft 310, the eccentric portion 311 of the crankshaft 310 circulates. Accordingly, the circular motion of the eccentric portion 311 of the crankshaft 310 is converted into a linear reciprocating motion by virtue of the detachable connecting rod, which connects the eccentric portion 311 of the crankshaft 310 to the piston 340 inserted into the cylinder 330. The linear reciprocating motion is then delivered to the piston 340. As the piston 340 linearly reciprocates within the cylinder 330, gas is sucked into the cylinder 330 and then the sucked gas is compressed to be discharged thereafter.

When coupling the detachable connecting rod to the eccentric portion 311 of the crankshaft 310 and to the piston 340, where the second member 420 is coupled to piston 340 and is already inserted into the cylinder 330, the first member 410 is inserted into the eccentric portion 311 of the crankshaft 310 in the perpendicular direction and simultaneously is coupled to the second member 420, so as to align the pin holes 415 of the first member 410 to the pin holes 423 of the second member 420, which results in simplifying the assembling process.

In addition, the first member 410 and the second member 420 of the detachable connecting rod, which connects the crankshaft 310 to the piston 340, are coupled to each other by use of two or more coupling pins 430. Accordingly, a force applied to the coupling pins 430 is distributed to thus prevent the deformation of the coupling pins 430 and also to allow the first member 410 and the second member 420 to be more securely connected to each other in upper and lower directions and in back and forth directions. Accordingly, the first member 410 and second member 420 can keep being firmly connected to each other without a change in their positions, whereby it is able to prevent the change in positions of upper and lower dead points of the piston 340, thereby continuously generating a constant cooling capacity.

The invention claimed is:

1. A detachable connecting rod comprising:
    a first member including a large end portion having a through hole, and a first connection rod portion extending from the large end portion, the first connection rod portion having a pair of spaced apart arms defining a coupling groove extending in the same direction as an axial direction of the through hole;
    a second member including a small end portion having a through hole, and a second connection rod portion extending from the small end portion, the second connection rod portion being inserted into the coupling groove; and
    a coupling unit for coupling the first connection rod portion to the second connection rod inserted into the coupling groove of the first member,
    wherein the detachable connecting rod further comprises:
    a guide protrusion extending from one of the pair of spaced apart arms towards the other of the pair of spaced apart arms, and having at least one pin hole formed therein, the guide protrusion extending in the same direction as the axial direction of the through hole of the first member; and
    a guide groove formed in the second connection rod portion of the second member, and having at least one pin hole formed therein, the guide groove corresponding to the guide protrusion, and
    wherein the coupling unit comprises at least one coupling pin inserted into the guide protrusion and the guide groove.

2. The detachable connecting rod of claim 1, wherein the coupling unit comprises two coupling pins that are penetratingly inserted into the pin holes.

3. The detachable connecting rod of claim 2, wherein the two coupling pins are spaced apart in the same direction as the axial direction of the through hole of the first member.

4. The detachable connecting rod of claim 3, wherein the two coupling pins are connected to each other.

5. The detachable connecting rod of claim 2, wherein the two coupling pins are spaced apart in a direction perpendicular to the axial direction of the through hole of the first member.

6. The detachable connecting rod of claim 5, wherein the two coupling pins are connected to each other.

7. A compressor comprising:
    a driving motor for generating a rotation force;
    a crankshaft having an eccentric portion and rotated by receiving the rotation force of the driving motor;
    a piston inserted into a cylinder; and
    a detachable connecting rod coupled to the crankshaft and piston;
    wherein detachable connecting rod comprising:
    a first member including a large end portion having a through hole in which the crankshaft is inserted, and a first connection rod portion extending from the large end portion, the first connection rod portion having a pair of spaced apart arms defining a coupling groove extending in the same direction as an axial direction of the through hole;
    a second member including a small end portion having a through hole in which a piston pin connected to the piston is inserted, and a second connection rod portion extending from the small end portion, the second connection rod portion being inserted into the coupling groove;
    a coupling unit for coupling the first connection rod portion of the first member to the second connection rod portion of the second member inserted into the coupling groove of the first member;
    a guide protrusion extending from one of the pair of spaced apart arms towards the other of the pair of spaced apart arms, and having at least one pin hole formed therein, the guide protrusion extending in the same direction as the axial direction of the through hole of the first member; and
    a guide groove formed in the second connection rod portion of the second member, and having at least one pin hole formed therein, the guide groove corresponding to the guide protrusion, and
    wherein the coupling unit comprises at least one coupling pin inserted into the guide protrusion and the guide groove.

* * * * *